United States Patent
Lackore, Jr. et al.

(10) Patent No.: US 10,370,032 B2
(45) Date of Patent: Aug. 6, 2019

(54) DUAL RUBBER BODY MOUNT

(71) Applicants: James Roger Lackore, Jr., Big Bend, WI (US); Scott D. Williamson, Dodge, NE (US)

(72) Inventors: James Roger Lackore, Jr., Big Bend, WI (US); Scott D. Williamson, Dodge, NE (US)

(73) Assignee: Spartan Motors, Inc., Charlotte, MI (US)

( * ) Notice: Subject to any disclaimer, the term of this patent is extended or adjusted under 35 U.S.C. 154(b) by 139 days.

(21) Appl. No.: 15/703,829

(22) Filed: Sep. 13, 2017

(65) Prior Publication Data
US 2019/0077461 A1 Mar. 14, 2019

(51) Int. Cl.
*B62D 21/02* (2006.01)
*B62D 21/11* (2006.01)
*B62D 21/15* (2006.01)

(52) U.S. Cl.
CPC .......... *B62D 21/11* (2013.01); *B60G 2204/15* (2013.01); *B62D 21/155* (2013.01)

(58) Field of Classification Search
CPC ... B62D 21/11; B62D 21/155; B60G 2204/15
USPC .................................. 280/784, 788, 124.109
See application file for complete search history.

(56) References Cited

U.S. PATENT DOCUMENTS

| | | | | |
|---|---|---|---|---|
| 7,111,854 B1* | 9/2006 | Tuthill | ................... | B60G 11/24 280/789 |
| 2006/0202400 A1* | 9/2006 | Fitzgerald | ............. | F16F 1/3732 267/293 |
| 2006/0255516 A1* | 11/2006 | Dickson | .................. | F16F 3/093 267/141.1 |
| 2014/0203543 A1* | 7/2014 | Onishi | .................. | B62D 21/155 280/784 |
| 2015/0273973 A1* | 10/2015 | Tomizawa | ......... | B60G 21/0551 280/124.109 |
| 2016/0096408 A1* | 4/2016 | Hicks | ................... | B60G 99/002 280/124.109 |
| 2019/0039432 A1* | 2/2019 | Xu | ...................... | B60G 21/0551 |

* cited by examiner

*Primary Examiner* — Toan C To
(74) *Attorney, Agent, or Firm* — Reinhart Boerner Van Deuren P.C.

(57) ABSTRACT

Provided herein are embodiments of a mount for joining a substructure to a vehicle frame. The mount allows the substructure to float on the frame by permitting vertical movement of the substructure relative to the frame. Further, the mount restricts lateral and fore/aft movement of the substructure on the frame, helping to reduce any further contributions to frame torque. The mount is joined to the frame at a lower end and has a crook-shaped or C-shaped profile that wraps around an alignment tab of the substructure. Further, a rubber pad is provided on the alignment tab, and the mount has a structure, such as one or more stops, bolts, or pins, that extends downwardly around or through the rubber tab. It is the downwardly extending structure allows for the vertical movement of the substructure while also preventing substantial lateral and fore/aft movement of the substructure relative to the frame.

20 Claims, 7 Drawing Sheets

DUAL RUBBER BODY MOUNT

FIELD OF THE INVENTION

This invention generally relates to vehicle construction and more particularly to vehicles having a substructure and a frame.

BACKGROUND OF THE INVENTION

Large vehicles, such as firetrucks, delivery trucks, dump trucks, recreational vehicles, etc., often have large bodies extending well beyond the width of the vehicle frame. In such vehicles, a substructure is often included to enhance support for body on the frame and to prevent torsional forces on the frame from transferring to the vehicle body. In this way, the substructure is designed to "float" on the frame.

Put differently, the substructure is attached to the frame in such a way that the substructure is able to move relative to the frame in the vertical direction. Accordingly, the substructure isolates the body from frame twist damage. However, the vertical movement must be limited so that damaging stresses are reduced while still securing the body to the vehicle. Additionally, the substructure should also be prevented from movement in the lateral and horizontal directions to keep the body on the vehicle and to prevent interference with other parts of the vehicle.

Embodiments of the present disclosure provide a mount that allows a vehicle substructure to float on a frame so as to avoid transferring torsional stresses to the vehicle body. These and other advantages of the invention, as well as additional inventive features, will be apparent from the description of the invention provided herein.

BRIEF SUMMARY OF THE INVENTION

Disclosed herein are embodiments of a mount for joining a substructure to a vehicle frame. The mount allows the substructure to float on the frame by permitting vertical movement of the substructure relative to the frame. Further, the mount restricts lateral and fore/aft movement of the substructure on the frame, helping to reduce any further contributions to frame torque. The mount is joined to the frame at a lower end and has a crook-shaped or C-shaped profile that wraps around an alignment tab of the substructure. Further, a rubber pad is provided on the alignment tab, and the mount has a structure, such as one or more stops, bolts, or pins, that extends downwardly around or through the rubber pad. It is the downwardly extending structure allows for the vertical movement of the substructure while also preventing substantial lateral and fore/aft movement of the substructure relative to the frame.

The above-described mount is able to be used with a variety of vehicle that feature a substructure floating on a vehicle frame, such as firetrucks, delivery trucks, dump trucks, recreational vehicles, and the like. In particular, the mount is preferably used along with a rubber strip provided between the substructure and the frame, running along at least a portion of the length of the interface between the substructure and frame. The use of two rubber strips, i.e., a "dual rubber mount," suppresses torque transfer between the vehicle frame and the substructure and vehicle body.

In one aspect, embodiments of a mount configured to secure a substructure to a frame are provided. In particular, the substructure includes at least one alignment tab upon which a rubber pad is attached. The mount includes a lower section configured for attaching the mount to the frame and a midsection that extends from the lower section laterally away from the frame. The mount also includes an upper section that extends vertically from the midsection and an overhang section that projects from the upper section laterally towards the substructure and over the rubber pad. Further, the mount includes at least one structure extending from the overhang section around or through the rubber pad in such a way as to allow vertical movement of the substructure on the frame.

In another aspect, embodiments of a chassis for a vehicle are provided. The chassis includes a frame having a first side rail laterally disposed from a second side rail. The chassis also includes a substructure. The substructure has at least a first alignment tab and a second alignment tab. The first alignment tab is positioned on a first side of the substructure, and the second alignment tab is positioned on a second side of the substructure. A first rubber strip is positioned between the first side of the substructure and the first side rail, and a second rubber strip positioned between the second side of the substructure and the second side rail. The chassis also includes at least a first mount and a second mount. The first mount is attached to the first side rail and the second mount being attached to a second side rail. Each of the first alignment tab and the second alignment tab include a rubber pad positioned thereon. Each of the first mount and the second mount include at least one structure extending around or through the rubber pad of each of the respective first alignment tab and the second alignment tab in such a way as to provide vertical movement of the substructure on the frame.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of mounts for securing a substructure to a vehicle frame are disclosed herein. In particular, embodiments of the mounts allow for some limited movement of the substructure in the vertical direction while restricting lateral and fore/aft movement of the substructure relative to the vehicle frame. In embodiments, the mount has a crook-shaped or C-shaped profile including a region that hangs over an alignment tab of the substructure. A rubber strip is provided between the overhang region and the alignment tab, and a structure, such as one or more tabs, bolts, pins, etc., extends downwardly from the overhang section around or through the rubber pad. In particular, it is the downwardly extending structure that allows for the vertical movement of the substructure and that prevents the lateral and fore/aft motion of the substructure. The embodiments of the mounts presented herein are for the purposes of illustration only and are not provided by way of limitation.

Figure 1:
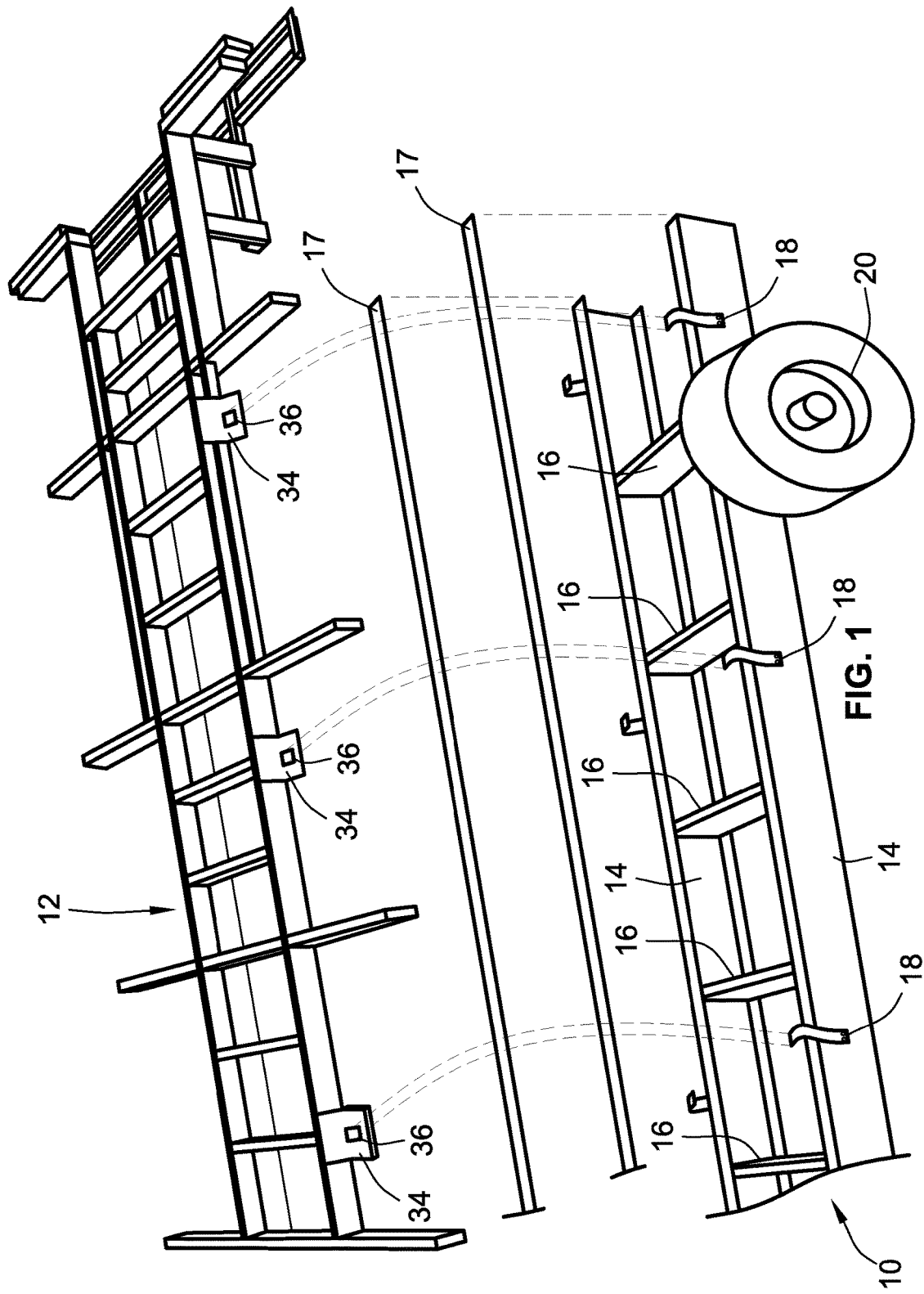
FIG. 1 is a isometric exploded view of a substructure, rubber strips, and a vehicle frame, according to an exemplary embodiment.

FIG. 1 depicts a frame 10 and substructure 12 of a vehicle. The frame 10 generally includes two longitudinally extending side rails 14 that are laterally disposed from each other. The side rails 14 are joined with a plurality of cross-braces 16 located at various points along the length of the side rails 14. The frame 10 is the main supporting structure of the vehicle to which all other components are ultimately attached.

The substructure 12 is a skeletal structure upon which a vehicle body is mounted. In particular, the substructure 12 is designed to support vehicle bodies that extend laterally outside the frame 10 and/or longitudinally past the end of the frame 10. In this way, the substructure 12 is attached to the frame 10 and provides, for example, additional mounting surfaces for components that, e.g., extend below or far beyond the frame 10, or a raised flat platform upon which a vehicle body, bed, cargo hold, etc. can be mounted. Additionally, the substructure 12 helps isolate the vehicle body from the twisting and torquing of the frame 10.

A rubber strip 17 runs longitudinally along at least a portion of the length of each side rail 14 between the frame 10 and the substructure 12. In alternative embodiments, multiple rubber strips 17 are spaced along each side rail 14 of the frame 10 to separate the frame 10 and the substructure 12. In this way, the substructure 12 sits on the frame 10 and is cushioned by the rubber strips 17 so as to, e.g., reduce the transmission of vibrations from the frame 10 to the substructure 12. Additionally, the rubber strips 17 are also able to reduce galvanic corrosion occurring between the frame 10 and substructure 12 in instances where the frame 10 and substructure 12 are made of dissimilar metals.

As can be seen in FIG. 1, the substructure 12 is secured to each side rail 14 of the frame 10 with three mounts 18. In the embodiment, shown, the three mounts 18 correspond to two mounts 18 in front of a rear wheel 20 of the vehicle and one mount 18 behind the rear wheel 20. In embodiments, only two mounts 18 are used to join the substructure 12 to the frame 10; however, in still other embodiments, more than three mounts 18 are used to join the substructure 12 to the frame 10. The mounts 18 secure the substructure 12 (and, thus, the vehicle body) to the frame 10 while still allowing relative motion of the substructure 12 in the vertical direction only. That is, the mounts 18 substantially prevent lateral motion of the substructure 12 as well as fore/aft motion of the substructure 12 on the fame 10.

Figure 2:
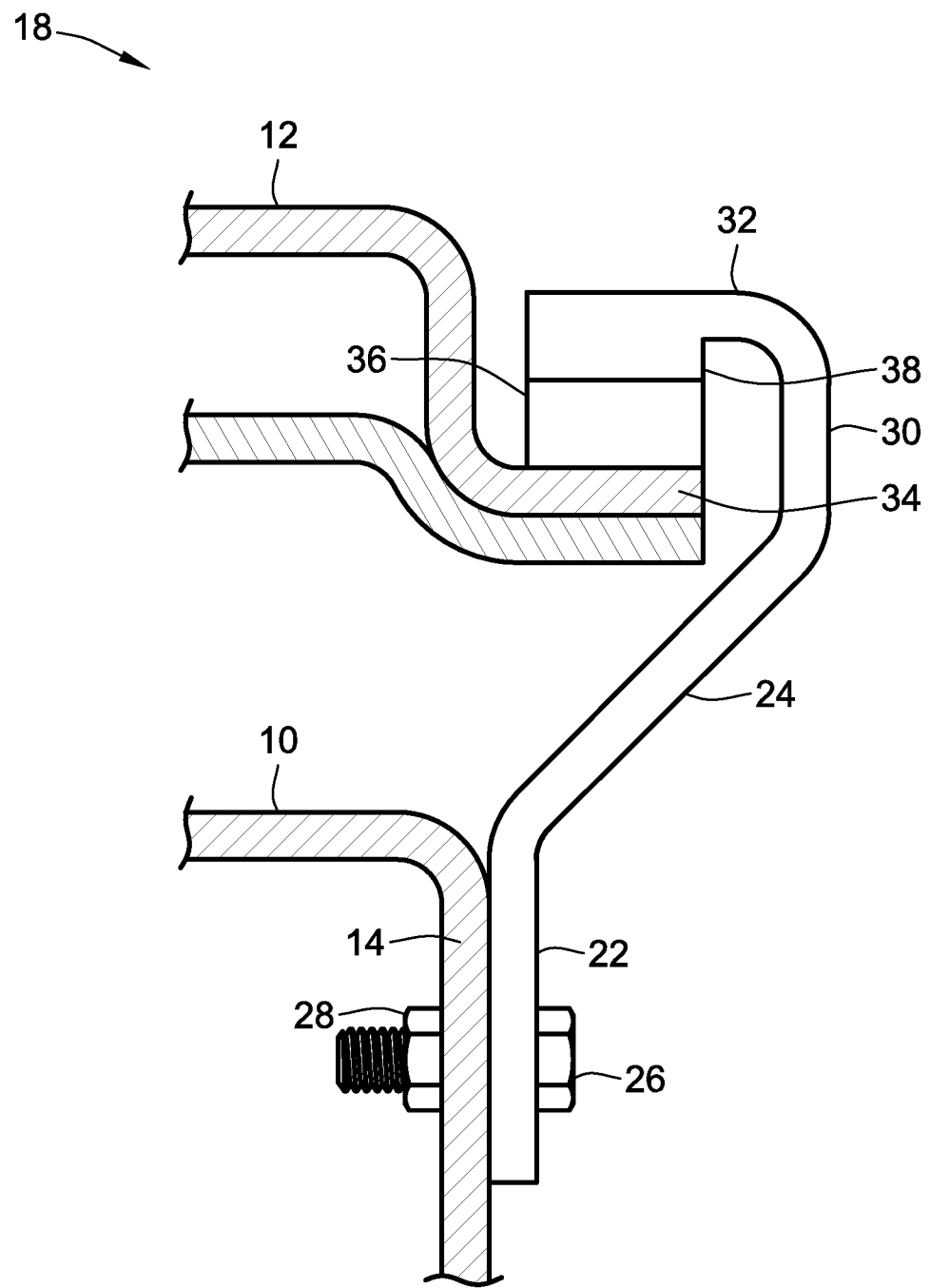
FIG. 2 is a side view of a first exemplary embodiment of a mount.

A detail view of a first embodiment of a mount 18 is depicted in FIG. 2. The mount 18 has a crook-shaped or C-shaped profile with a lower attachment section 22 transitioning to a laterally extending midsection 24. In the embodiment shown, the laterally extending midsection 24 extends both laterally and vertically (i.e., diagonally at an angle between 90° and 180° with respect to the lower attachment section 22), but in other embodiments, the laterally extending midsection 24 extends only laterally (e.g., at 90° with respect to the lower attachment section 22). The lower attachment section 22 is secured to the frame 10. In the exemplary embodiment depicted in FIG. 2, the lower attachment section 22 is bolted to the frame 10 using a threaded fastener 26 and a nut 28; however, in other embodiments, the lower attachment section 22 is welded to the frame 10. In still other embodiments, the lower attachment section 22 is secured to the frame using another reversible or permanent attachment method. Thus, secure attachment of the mount 18 to the frame is provided.

The laterally extending midsection 24 of the mount 18 transitions into a vertically extending upper section 30 from which an overhang region 32 projects. As shown in FIG. 2, the overhang regions 32 of each mount 18 project over a positioning tab 34 of the substructure 12. A rubber pad 36 is attached to each positioning tab 34. The rubber pad 34 provides a compressible buffer between the positioning tab 34 and the overhang region 32 of the mount 18. In this way, the substructure 12 is allowed vertical movement in relation to the frame 12, i.e., the substructure 12 is allowed to "float" on the frame 10.

While some vertical movement is desired to avoid transferring twisting forces, vibrations, and torque from the frame 10 to the substructure 12 (and, consequently to the vehicle body), it is desirable to avoid substantial lateral and fore/aft motion. Substantial lateral motion is prevented by the vertically extending upper sections 30 of each mount. In particular, substantial lateral movement of the substructure 12 is blocked because the positioning tabs 34 of the substructure 12 will contact the vertically extending upper sections 30. That is, the substructure 12 can only travel laterally so far as the bounds established by the vertically extending upper sections 30 of the mounts 18 on each side rail 14 of the frame 10.

Figure 3:
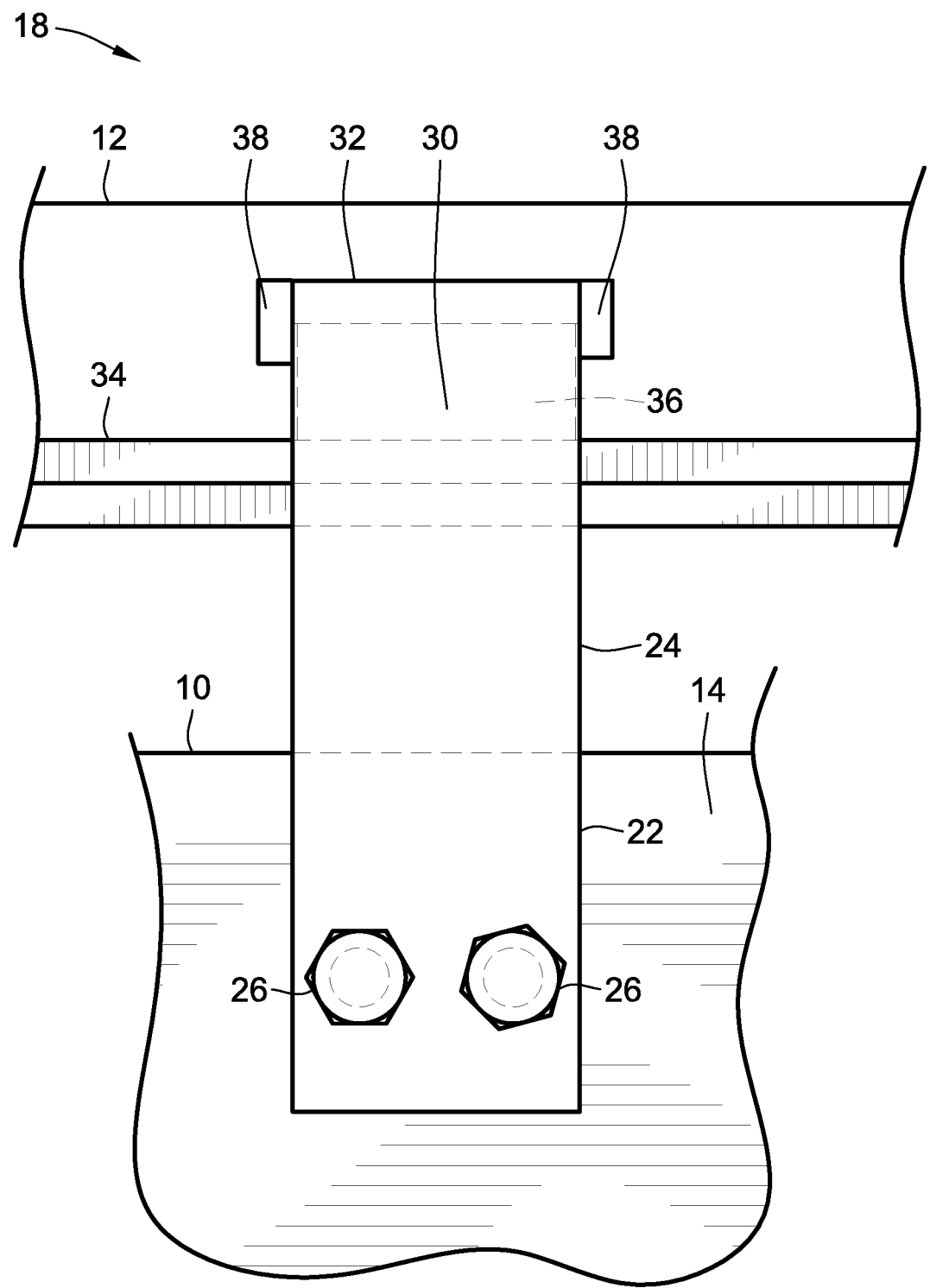
FIG. 3 is a rear view of the embodiment of the mount shown in FIG. 2.

In the embodiment of the mount 18 depicted in FIG. 2, the downwardly extending structure that prevents substantial fore/aft motion is stops 38 depending from the overhang region 32. Referring now to FIG. 3, it can be seen that the overhang region 32 of mount 18 includes two stops 38 that prevent substantial fore/aft motion of the substructure 12. As depicted in FIG. 3, the stops 38 extend downwardly for only a portion of the thickness of the rubber pad 36 bounded by the stops 38, such as for example half the thickness of the rubber pad 36 or less. In other embodiments, the stops 38 extend downwardly more than half or over the entire length of the rubber pad 36, and in yet other embodiments, the stops 38 extend downwardly past the rubber pad 36. In this way, the stops 38 prevent substantial fore/aft travel of the substructure 12 by bounding each of the rubber pads 36 and/or each positioning tab 34 between the two stops 38 of the overhang region 32.

Figure 4:
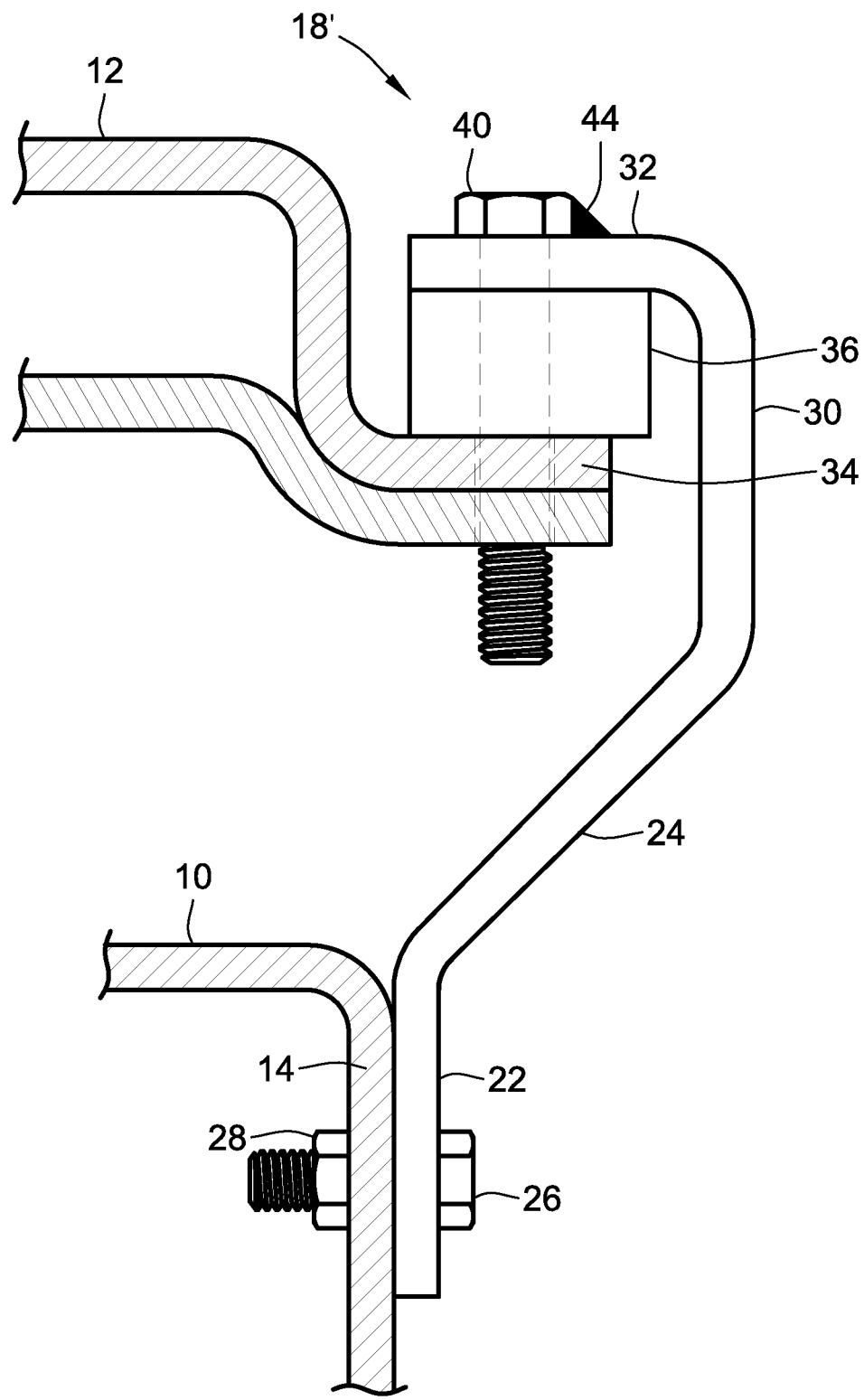
FIG. 4 is a side view of a second exemplary embodiment of a mount.

FIG. 4 depicts another embodiment of a mount 18' in which the downward extending structure that prevents fore/aft and lateral motion of the substructure 12 is one or more bolts 40. In general, the mount 18' is of the same structure as the previous embodiment in that the mount 18' includes a lower attachment section (not shown), a laterally extending midsection 24, a vertically extending upper section 30, and an overhang section 32. In this embodiment of the mount 18', though, bolts 40 are inserted through holes in the overhang region 32 of the mount 18', through the rubber pad 36, and through holes 42 in the positioning tab 34. Fore/aft and lateral motion are, thus, prevented because the bolts 40 cannot move beyond the bounds of the holes 42 into which they are inserted.

Figure 5:
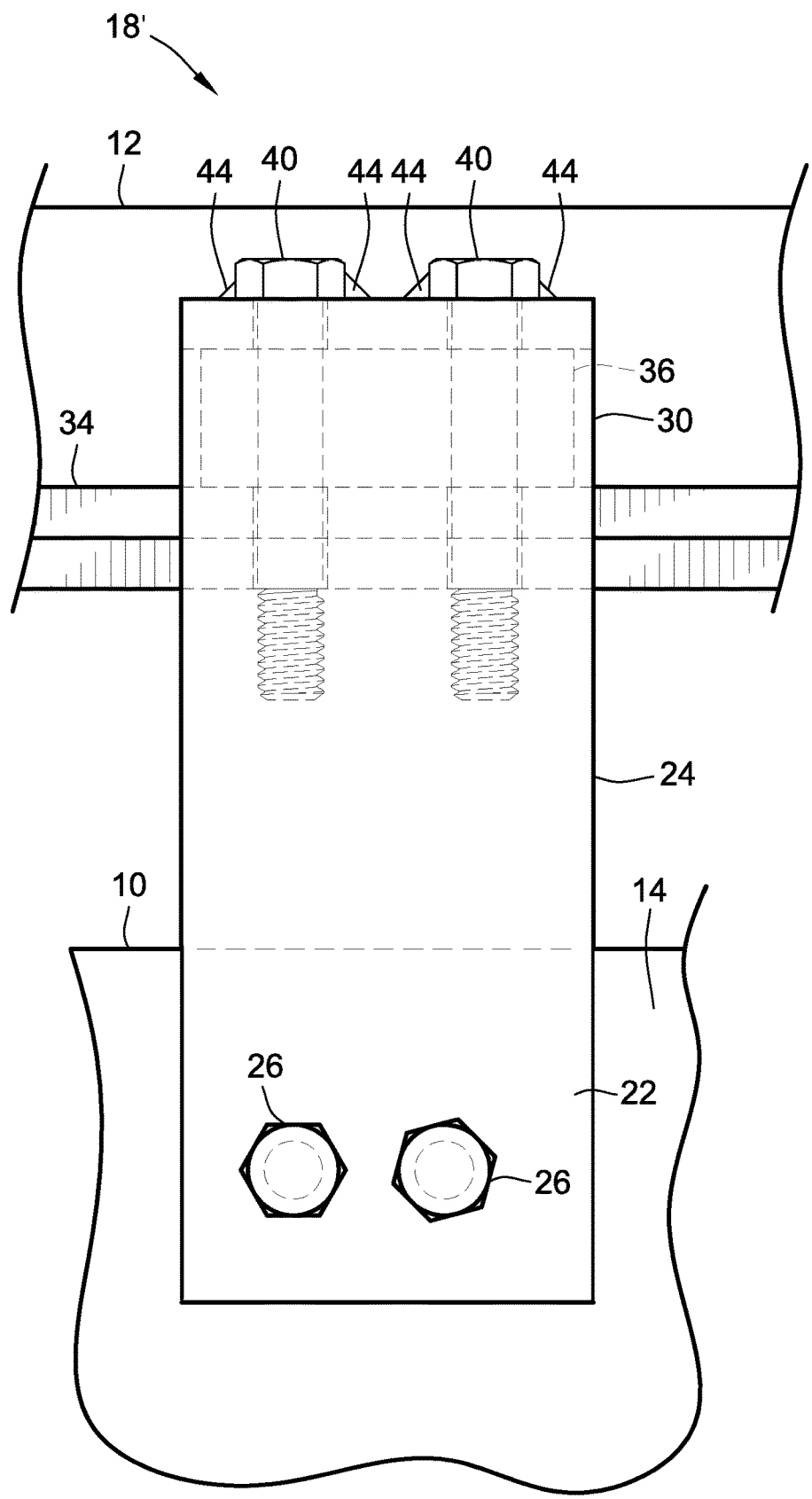
FIG. 5 is a rear view of the embodiment of the mount shown in FIG. 4.

Further, in the embodiment depicted in FIG. 4, the bolts 40 are secured in place with a weld 44 joining the head of each bolt 40 to the overhang region 32. However, in another embodiment, the bolts 40 are secured in place using a nut welded onto the shank of the bolt 40, e.g., near the end of the shank. In this way, the bolt 40 is secured against slipping free, and the substructure 12 is allowed some vertical movement to float on the frame 10. As depicted in the embodiment of FIG. 5, the mount 18' includes two bolts 40 to secure the substructure 12 from lateral and fore/aft motion. However, in other embodiments, a single bot 40 is used, and in still other embodiments, more than two bolts 40 are used.

Figure 6:
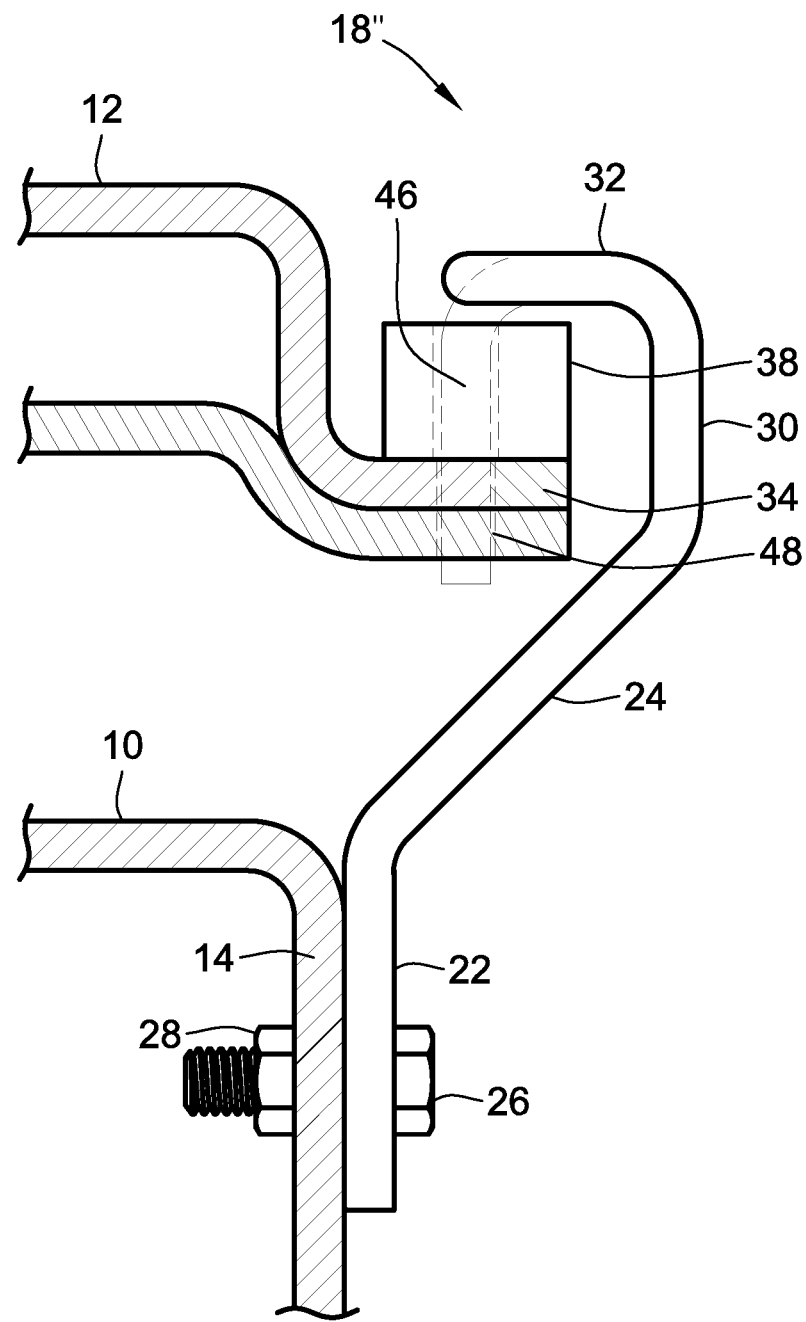
FIG. 6 is a side view of a third exemplary embodiment of a mount.
Figure 7:
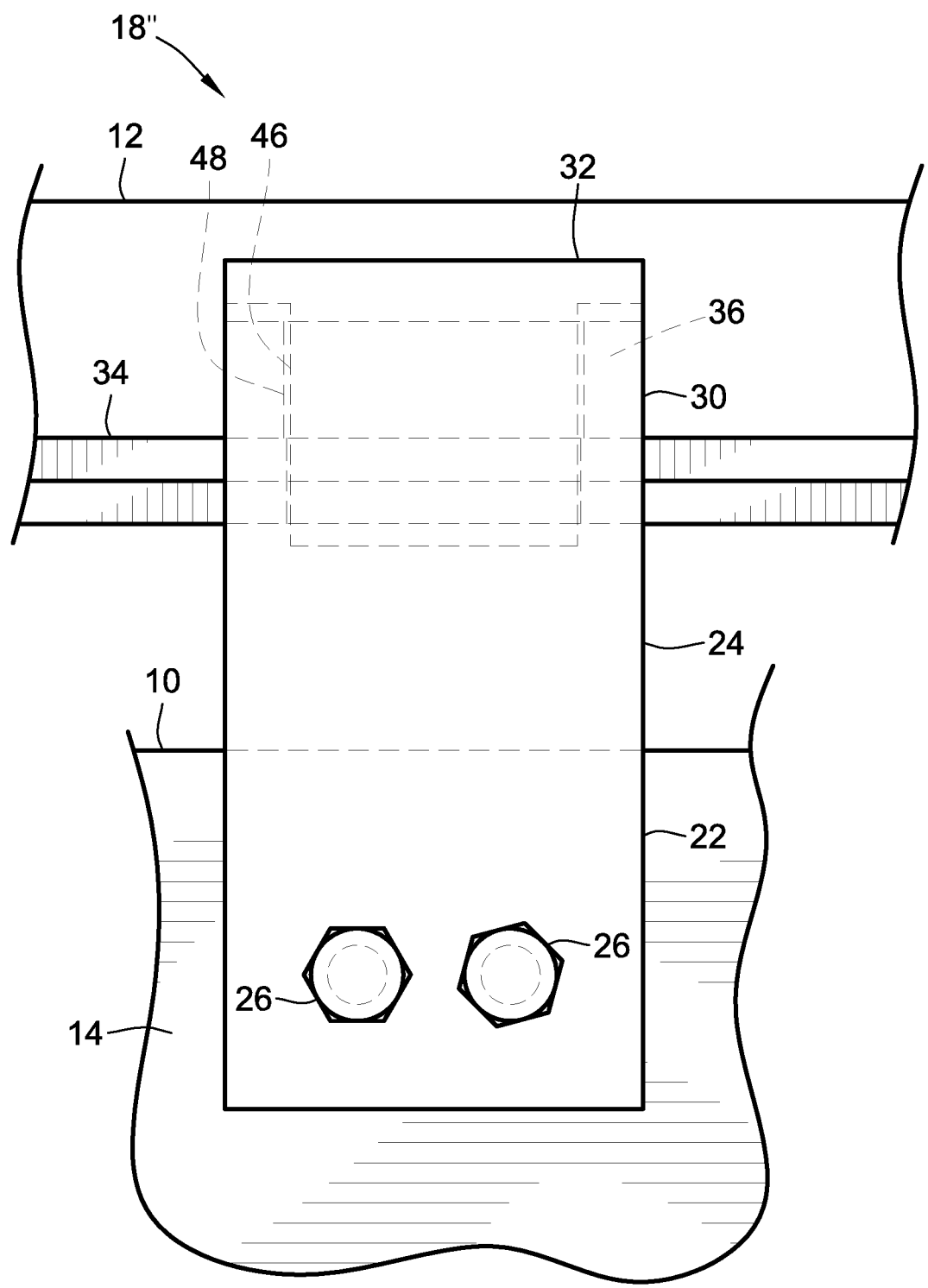
FIG. 7 is a rear view of the embodiment of the mount shown in FIG. 6.

FIG. 6 depicts still another embodiment of the front mount 18". In general, the mount 18" is of the same structure as the previous embodiments in that the mount 18" includes a lower attachment section 22, a laterally extending midsection 24, a vertically extending upper section 30, and an overhang section 32. In this embodiment of the mount 18", though, the downwardly extending structure that prevents substantial lateral and fore/aft motion is a depending tab 46. In particular, the depending tab 46 extends from the overhang region 32 and inserts into a slot 48 formed through the rubber pad 36 and the positioning tab 34 of the substructure 12. As shown in FIG. 6, the depending tab 46 is bent downwardly from the overhang section 32. Referring now to FIG. 7, it can be seen that the depending tab 46 is wider than it is thick; however, in other embodiments, the depending tab 46 is as wide as it is thick or is thicker than it is wide.

The depending tab 46 is not secured at its lower end 50 such that the depending tab 46 is able to move vertically within the slot 48. However, the slot 48 prevents substantially fore/aft and lateral movement of the substructure 12. In this way, the substructure 12 is able to float on the frame 10 as in the previously described embodiments.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mount configured to secure a substructure to a frame, wherein the substructure includes at least one alignment tab upon which a rubber pad is attached, the mount comprising:
    a lower section configured for attaching the mount to the frame;
    a midsection that extends from the lower section laterally away from the frame;
    an upper section that extends vertically from the midsection;
    an overhang section that projects from the upper section laterally towards the substructure and over the rubber pad; and
    at least one structure extending from the overhang section around or through the rubber pad in such a way as to allow vertical movement of the substructure on the frame.

2. The mount of claim 1, wherein the at least one structure extending from the overhang section is two stops that extend from the overhang section at least partially around the rubber pad.

3. The mount of claim 2, wherein each of the two stops depend from the overhang section to an extent that is less than or equal to half of a thickness of the rubber pad.

4. The mount of claim 2, wherein each of the two stops depend from the overhang section to an extent that is more than half of a thickness of the rubber pad.

5. The mount of claim 1, wherein the at least one structure extending from the overhang section is at least one bolt that extends through the overhang structure, the rubber pad, and the alignment tab.

6. The mount of claim 5, wherein the at least one bolt is welded to the overhang section.

7. The mount of claim 5, wherein the at least one bolt comprises a shank having an end that extends past the alignment tab and wherein a nut is permanently affixed to the end of the shank.

8. The mount of claim 5, wherein the at least one bolt is two bolts.

9. The mount of claim 1, wherein the at least one structure extending from the overhang section is a depending tab configured to extend through a slot defined by the rubber pad and by the alignment tab.

10. The mount of claim 9, wherein the depending tab is a portion of the overhang section that is bent perpendicular to the overhang section.

11. The mount of claim 9, wherein the depending tab has a width that is greater than a thickness of the depending tab.

12. The mount of claim 1, wherein the at least one structure extending from the overhang section prevents lateral motion and fore/aft motion of the substructure on the vehicle frame.

13. A chassis for a vehicle, comprising:
    a frame having a first side rail laterally disposed from a second side rail;
    a substructure including at least a first alignment tab and a second alignment tab, the first alignment tab positioned on a first side of the substructure and the second alignment tab positioned on a second side of the substructure;

a first rubber strip positioned between the first side of the substructure and the first side rail;

a second rubber strip positioned between the second side of the substructure and the second side rail;

at least a first mount and a second mount, the first mount being attached to the first side rail and the second mount being attached to a second side rail;

wherein each of the first alignment tab and the second alignment tab include a rubber pad positioned thereon; and wherein each of the first mount and the second mount include at least one structure extending around or through the rubber pad of each of the respective first alignment tab and the second alignment tab in such a way as to provide vertical movement of the substructure on the frame.

14. The chassis of claim 13, wherein the first mount and the second mount prevent lateral motion and fore/aft motion of the substructure on the vehicle frame.

15. The chassis of claim 13, wherein each of the first mount and the second mount comprise an overhang section that projects over the rubber pad and wherein the at least one structure extends from the overhang section.

16. The chassis of claim 15, wherein the at least one structure extending from the overhang section is two stops that extend from the overhang section at least partially around the rubber pad.

17. The chassis of claim 15, wherein the at least one structure extending from the overhang section is at least one bolt that extends through the overhang structure, the rubber pad, and the alignment tab.

18. The chassis of claim 17, wherein the at least one bolt is welded to the overhang section.

19. The chassis of claim 15, wherein the at least one structure extending from the overhang section is a depending tab configured to extend through a slot defined by the rubber pad and by the alignment tab.

20. The chassis of claim 19, wherein the depending tab is a portion of the overhang section that is bent perpendicular to the overhang section.

* * * * *